(12) United States Patent
Naga et al.

(10) Patent No.: US 8,868,647 B2
(45) Date of Patent: Oct. 21, 2014

(54) REDUCING LATENCY AND COST IN RESILIENT CLOUD FILE SYSTEMS

(75) Inventors: Krishna Puttaswamy Naga, Metuchen, NJ (US); Thyaga Nandagopal, Edison, NJ (US); Yadi Ma, Madison, WI (US)

(73) Assignee: Alcatel Lucent, Boulogne-Billancourt (FR)

( * ) Notice: Subject to any disclaimer, the term of this patent is extended or adjusted under 35 U.S.C. 154(b) by 155 days.

(21) Appl. No.: 13/348,243

(22) Filed: Jan. 11, 2012

(65) Prior Publication Data
US 2013/0179490 A1 Jul. 11, 2013

(51) Int. Cl.
*G06F 15/16* (2006.01)
(52) U.S. Cl.
USPC .......................................... 709/203; 709/217
(58) Field of Classification Search
USPC ........................................................ 709/203
See application file for complete search history.

(56) References Cited

U.S. PATENT DOCUMENTS

| 7,472,334 B1 | 12/2008 | Scott | |
| 2006/0069800 A1* | 3/2006 | Li | 709/232 |
| 2011/0078277 A1 | 3/2011 | Baptist | |

FOREIGN PATENT DOCUMENTS

EP 1633112 A1 3/2006

OTHER PUBLICATIONS

Improving Data Availability for Better Access Performance: A Study on Caching Scientific Data on Distributed Desktop Workstations. Xiaosong Ma; Sudharshan S. Vazhkudai; Zhe Zhang. Jul. 16, 2009.*
Xiaosong Ma et al; Improving Data Availability for Beter Access Performance; Journal of Grid Computingp; vol. 7, No. 4, Jul. 16, 2009; pp. 419-438; Kluwer Academic Publishers, DO.
International Search Report for PCT/US2013/020783 dated Apr. 25, 2013.

* cited by examiner

*Primary Examiner* — Tauqir Hussain
(74) *Attorney, Agent, or Firm* — Kramer Amado P.C.

(57) ABSTRACT

Various exemplary embodiments relate to a method of storing a file block in a cloud system including a plurality of data centers. The method may include; receiving the file block from a client; generating a plurality of chunks from the file block, wherein each chunk is smaller than the file block and the file block may be reconstructed from a subset of the chunks; distributing each chunk to one of the plurality of data centers; and storing the file block in a cache. Various exemplary embodiments relate to a cloud system for storing files. The system may include a plurality of data centers including a primary data center. The primary data center may include: a cache configured to store at least one complete file block; a chunk storage configured to store a chunk for each of a plurality of file blocks; a file encoder; and a file decoder.

22 Claims, 6 Drawing Sheets

REDUCING LATENCY AND COST IN RESILIENT CLOUD FILE SYSTEMS

TECHNICAL FIELD

Various exemplary embodiments disclosed herein relate generally to computer file systems.

BACKGROUND

Cloud computing may be defined as the delivery of a computing service over a network using shared resources. Cloud computing often requires the storage of data files so that they are accessible to a variety of users. File storage may be viewed as a cloud computing service. Various end users may access files stored by a cloud service provider without knowing exactly how the files are stored.

SUMMARY

File storage in a cloud computing environment poses a variety of problems for cloud service providers and users. Cloud services sometimes suffer from latency problems because a file must be located and transferred across the network to the end user. Users may desire a cloud service that provides requested files with low latency. Cloud services may also suffer from unavailability if a data center or part of the network is unavailable. Users may desire a cloud service that provides resiliency when a cloud component is unavailable. Low latency and high resiliency often require additional costs to the cloud service provider and/or user.

In view of the foregoing, it would be desirable to provide a file system for cloud computing. In particular, it would be desirable to provide a method and system for storing files with low latency and high resiliency at a low cost.

In light of the present need for a file system for cloud computing, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of storing a file in a cloud system including a plurality of data centers. The method may include: receiving, at a first data center, a file block from a client; generating a plurality of chunks from the file block, wherein each chunk is smaller than the file and the file block may be reconstructed from a subset of the chunks; distributing each chunk to a different one of the plurality of data centers; and storing the file in a cache at the first data center.

In various alternative embodiments, the method further includes receiving a request, from a client, to read the file block; determining whether the file block is stored in the cache; if the file block is stored in the cache, sending the file block stored in the cache to the client. The method may also include: if the file block is not stored in the cache: requesting chunks from the plurality of data centers; receiving at least a subset of the plurality of chunks from the plurality of data centers; reconstructing the file block from the subset of chunks; storing the file block in a cache at the first data center; and sending the reconstructed file block to the client.

In various alternative embodiments, the step of generating a plurality of chunks from the file block includes using an erasure code to generate the plurality of chunks.

In various alternative embodiments, the method further includes: receiving a request to write to the file block; writing to the file block in the cache; closing the file; generating a second plurality of chunks from the file block; and distributing each chunk of the second plurality of chunks to a different one of the plurality of data centers. The second plurality of chunks may include only modified chunks.

In various alternative embodiments, the method further includes: comparing an actual storage and transfer cost for a current cache size with a hypothetical storage and transfer cost for a previous cache size; and adjusting the cache size based on the lower storage and transfer cost;

In various alternative embodiments, the method further includes: determining that the cache is full; and removing a file block from the cache.

In various alternative embodiments, the plurality of chunks are generated according to a systematic erasure code wherein the file block is divided into a subset of un-encoded chunks and a subset of coded chunks.

In various alternative embodiments, the number of chunks is at least two more than the number in a subset of chunks.

Various exemplary embodiments relate to the above described method encoded as instructions on a tangible, non-transitory, machine-readable storage medium.

Various exemplary embodiments relate to a cloud system for storing a file. The system may include a plurality of data centers including a primary data center. The primary data center may include: a cache configured to store at least one complete file block; a chunk storage configured to store a chunk for each of a plurality of file blocks; a file encoder configured to generate a plurality of chunks from the file, wherein each chunk is smaller than the file and the file block may be reconstructed from a subset of the chunks; and a file decoder configured to reconstruct a complete file block from a subset of the chunks.

In various alternative embodiments, the cache is a hard disk.

In various alternative embodiments, the primary data center further includes a client interface configured to receive complete files from a client and send complete files to a client.

In various alternative embodiments, the primary data center further includes a cloud interface configured to distribute a chunk of a plurality of chunks to each of a plurality of data centers and configured to receive a subset of chunks from the plurality of data centers.

In various alternative embodiments, the file encoder is configured to use erasure coding to generate the plurality of chunks.

In various alternative embodiments, the number of chunks in the subset is at least two less than the number of the plurality of chunks generated by the file encoder.

It should be apparent that, in this manner, various exemplary embodiments enable a method and file system for cloud computing. In particular, by distributing file chunks and providing a file cache at a data center the goals of high resiliency and low latency can be met at low cost.

BRIEF DESCRIPTION OF THE DRAWINGS

In order to better understand various exemplary embodiments, reference is made to the accompanying drawings, wherein.

DETAILED DESCRIPTION

Figure 1:
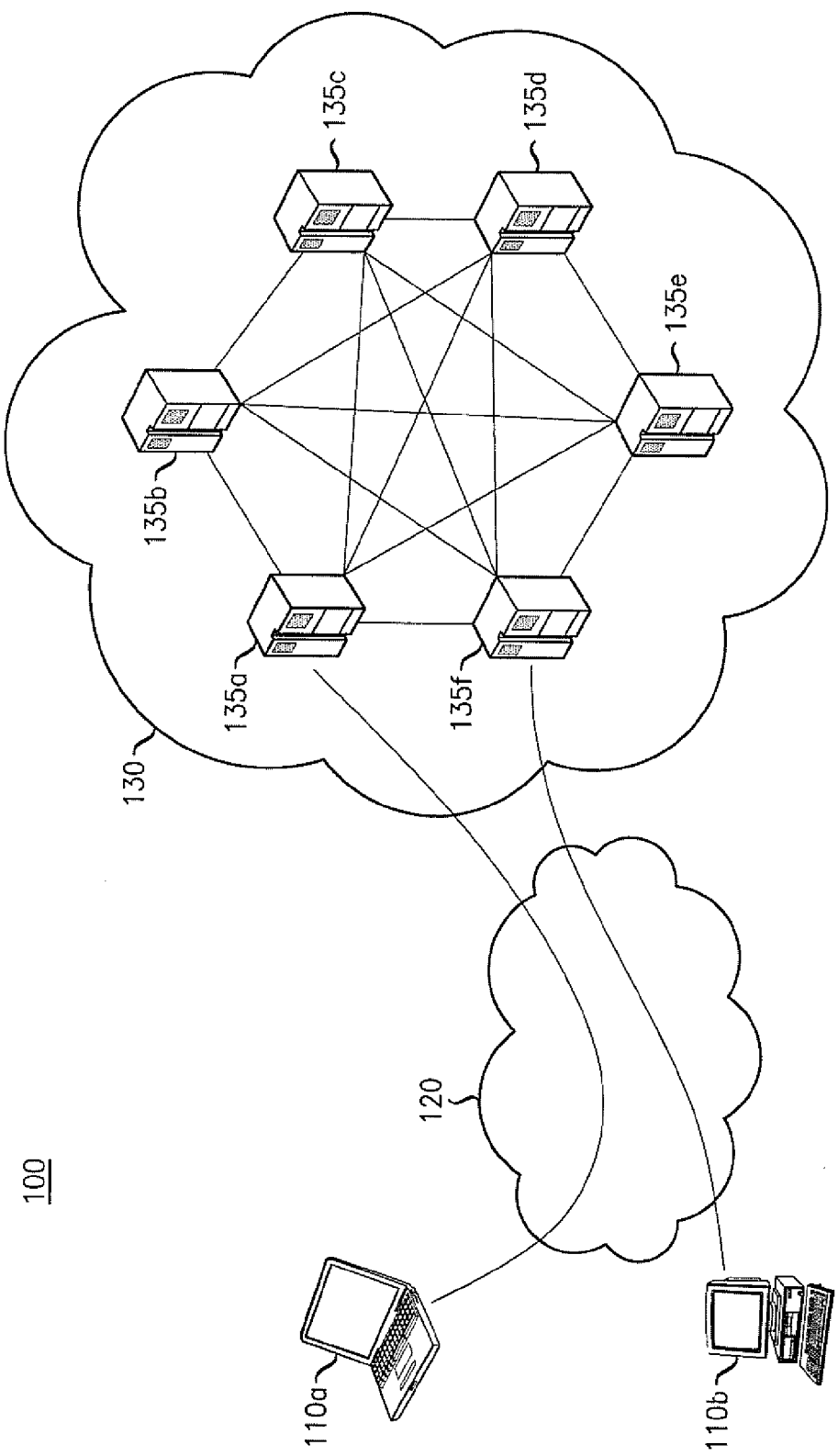
FIG. 1 illustrates an exemplary cloud environment for storing a file as a cloud service.

Referring now to the drawings, in which like numerals refer to like components or steps, there are disclosed broad aspects of various exemplary embodiments.

FIG. 1 illustrates an exemplary cloud environment 100 for storing a file as a cloud service. A file may be stored as one or more file blocks. Accordingly, a file block may be a part of a file or a complete file. Exemplary cloud environment 100 may include a user devices 110, network 120, and cloud service 130. Cloud service 130 may include a plurality of data centers 135. User device 110 may communicate with one or more data centers 135 of cloud service 130 through network 120. The cloud service 130 may provide data storage or other cloud services to user devices 110.

User devices 110 may include any device capable of communicating with cloud services 130 via network 120. For example, user device 110 may be a personal computer, laptop computer, mobile phone, smart phone, server, personal digital assistant, or any other electronic device. Multiple user devices 110a and 110b may access cloud service 130. Although only two user devices 110 are shown, it should be apparent that any number of user devices 110 may access cloud service 130.

Network 120 may include any communications network capable of processing digital communications between user devices 110 and data centers 135. Network 120 may be the Internet. Network 120 may provide various communication paths between user devices 110 and data centers 135.

Cloud service 130 may include one or more computing devices that provide a computing service to user devices 110. In various exemplary embodiments, the computing devices may be data centers 135 that store data files. Data centers 135 may be geographically distributed to help ensure resiliency. If a data center such as, for example, data center 135a, is unavailable due to a power outage or network failure, the other data centers 135b-f may remain available. Data centers 135 may communicate with each other. In various exemplary embodiments, data centers 135 may communicate with each other via dedicated or leased lines. Alternatively, data centers 135 may communicate with each other via network 120.

Data centers 135 may store data files in a distributed architecture to provide resiliency. Data files may be divided into one or more file blocks that may be requested and accessed by user devices 110. For example, a file block may be defined by a range of bytes within a data file. File blocks may be divided into a plurality of chunks and stored at each of the plurality of data centers 135. Only a subset of the chunks may be required to reconstruct a file block. Therefore, cloud service 130 may be able to provide access to a file block even if one or more of data centers 135 are unavailable.

One of the data centers 135 may be designated as a primary data center for a data file. The primary data center may be chosen as the data center 135 that is geographically closest to the user device 110 that initially stores the data file. For example, data center 135a may be the primary data center for user device 110a, while data center 135f may be the primary data center for user device 110b. The primary data center may include a cache that temporarily stores file blocks. The cached file blocks may provide faster access and reduce latency. Cached file blocks may also reduce the amount of data that must be transmitted between data centers 135. If the primary data center for a user device 110 or for a data file is unavailable, user device 110 may retrieve the file blocks from any other data center 135.

Figure 2:
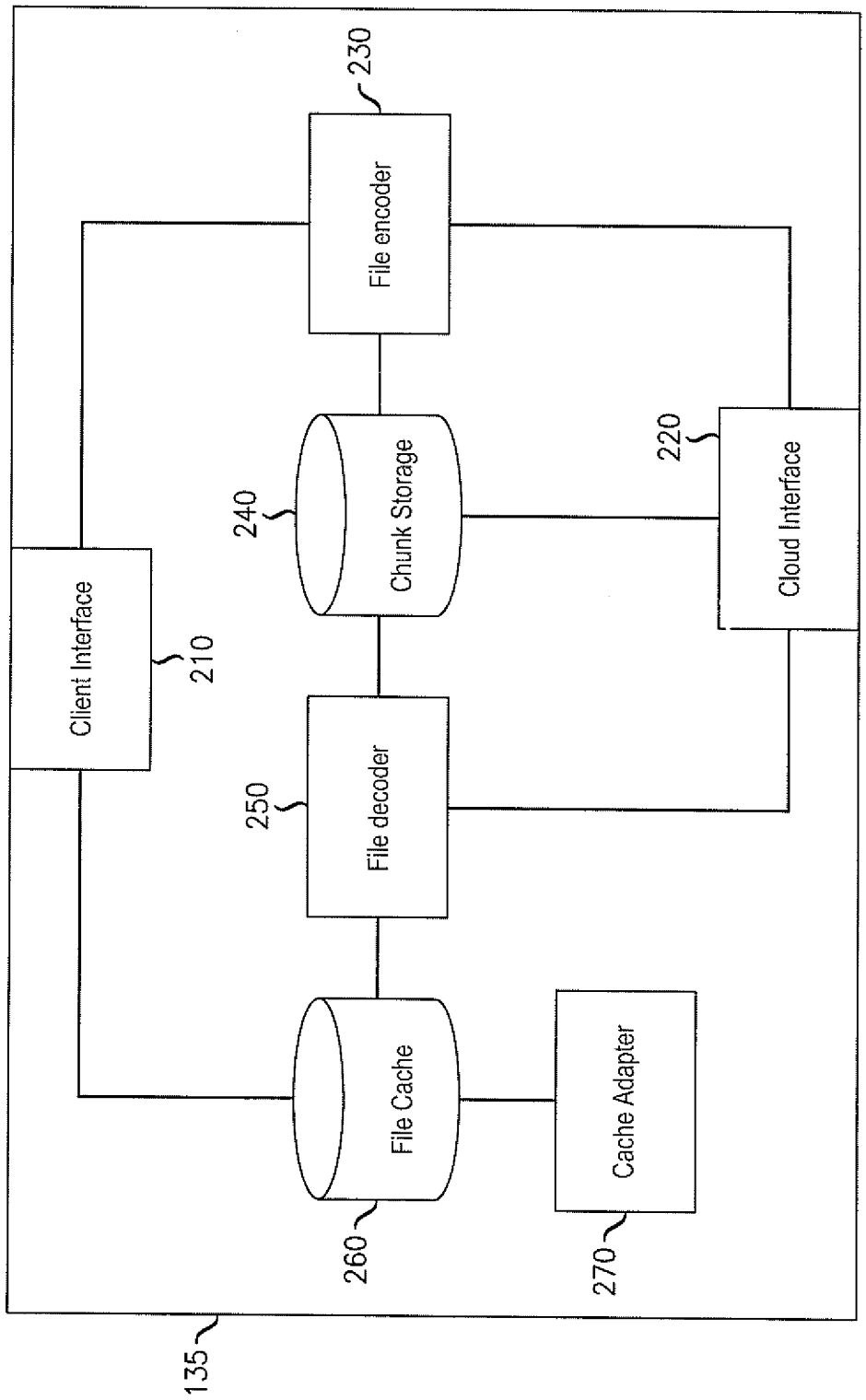
FIG. 2 illustrates an exemplary data center for providing file storage for a cloud service.

FIG. 2 illustrates an exemplary data center 135 for providing file storage for a cloud service. Exemplary data center 135 may be part of cloud service 130. Data center 135 may act as a primary data center for some data files and as a secondary data center for other files. Exemplary data center 135 may include client interface 210, cloud interface 220, file encoder 230, chunk storage 240, file decoder 250, file cache 260 and cache adapter 270.

Client interface 210 may be an interface comprising hardware and/or executable instructions encoded on a machine-readable storage medium configured to communicate with user devices 110. Client interface 210 may receive a file block from user device 110 and initiate the process of storing the file block. Client interface 210 may receive a request for a file block from a user device 110 and initiate the process of reading the file block. Client interface 210 may transmit a complete file block or complete data file to user device 110.

Cloud interface 220 may be an interface comprising hardware and/or executable instructions encoded on a machine-readable storage medium configured to communicate with other data centers 135. Cloud interface 220 may distribute encoded chunks of a file block to one or more other data centers 135. In various exemplary embodiments, cloud interface 220 distributes one chunk to each of a plurality of data centers 135. Cloud interface 220 may receive encoded chunks of a file block from one or more other data centers 135. Cloud interface 220 may access chunk storage 240 to read or store chunks.

File encoder 230 may include hardware and/or executable instructions encoded on a machine-readable storage medium configured to encode a file block as a plurality of chunks. As will be discussed in further detail below regarding FIGS. 3-7, the plurality of chunks may provide a resilient distributed format for storing the file block. In various exemplary embodiments, file encoder 230 may implement an erasure code for generating the plurality of chunks. Exemplary erasure codes suitable for generating the plurality of chunks may include Reed-Solomon codes, maximum distance separable (MDS) codes, and low density parity check (LDDC) codes. In various exemplary embodiments, file encoder 230 may use a systematic erasure code where the original file block is divided into a plurality of un-encoded chunks along with a separate set of coded chunks that are used for file recovery. In various alternative embodiments, other coding schemes may be used to generate chunks.

Chunk storage 240 may include any machine-readable medium capable of storing chunks generated by a file encoder such as file encoder 230. Accordingly, chunk storage 240 may include a machine-readable storage medium such as random-access memory (RAM), magnetic disk storage media, optical storage media, flash-memory devices, and/or similar storage media. In various exemplary embodiments, chunk storage 240 may provide persistent storage that maintains the stored chunks in case of power or device failure. Chunk storage 240 may use a journaling system to maintain integrity in case of a failure during a write operation. Chunk storage 240 may store chunks generated by file encoder 230 and/or chunks received via cloud interface 220.

File decoder 250 may include hardware and/or executable instructions encoded on a machine-readable storage medium configured to decode a subset of a plurality of chunks used to store the a file. File decoder 250 may receive a subset of chunks from chunk storage 240 and/or cloud interface 220. File decoder 250 may regenerate the file block from the subset of chunks. In various exemplary embodiments, file decoder 250 may implement an inverse operation of file encoder 230. File decoder 250 may use the same erasure code as file encoder 230. As will be described in further detail below regarding FIGS. 3-7, the subset of chunks required to regenerate the file block may be smaller than the plurality of chunks generated by file encoder 230.

File cache 260 may include any machine-readable medium capable of storing a complete file block. Accordingly, file cache 260 may include a machine-readable storage medium such as random-access memory (RAM), magnetic disk storage media, optical storage media, flash-memory devices, and/or similar storage media. In various exemplary embodiments, file cache 260 may provide persistent storage that maintains the file block in case of power or device failure. For example, file cache 260 may be a hard disk. Using a hard disk for file cache 260 may minimize costs while providing acceptable latency. File cache 260 may use a journaling system to maintain integrity in case of a failure during a write operation. File cache 260 may store file blocks received via client interface 210 and/or file blocks regenerated by file decoder 250.

File cache 260 may have a limited size determined by physical capacity and/or cache adapter 270. File cache 260 may include a cache manager that determines which file blocks to store in file cache 260. The cache manager may use a least recently used (LRU) cache replacement scheme. Accordingly, file cache 260 may include those file blocks that have recently been accessed by a client device.

Cache adapter 270 may include hardware and/or executable instructions encoded on a machine-readable storage medium configured to adjust the size of file cache 260. Cache adapter 270 may measure the usage of the cloud service 130 including the number and frequency of file access requests. Cache adapter 270 may attempt to minimize the cost of cloud service 130 by adjusting the size of file cache 260. Cache adapter 270 may consider the storage costs, processing costs, and transmission costs of cloud service 130. A larger cache may increase storage costs while reducing transmission and processing costs. A smaller cache may increase transmission and processing costs while reducing storage costs. An exemplary method of adjusting the size of file cache 260 will be described below regarding FIG. 7.

Figure 3:
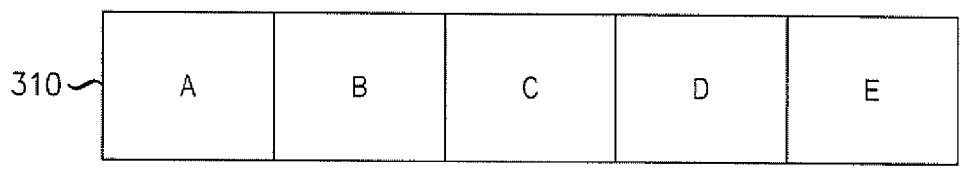
FIG. 3 illustrates an exemplary data structure for storing a file block.
Figure 3:
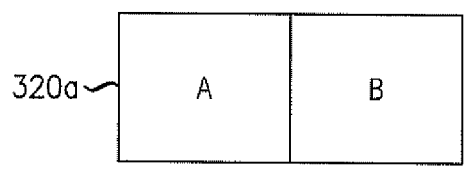
Figure 3:
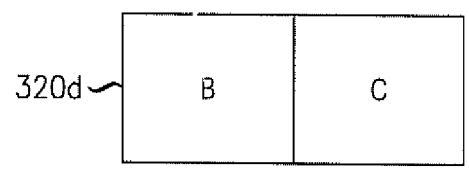
Figure 3:
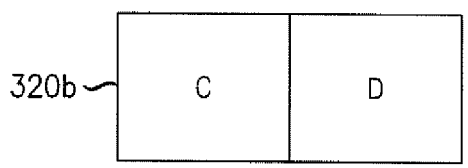
Figure 3:
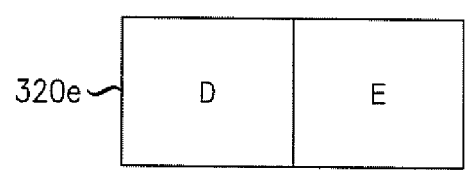
Figure 3:
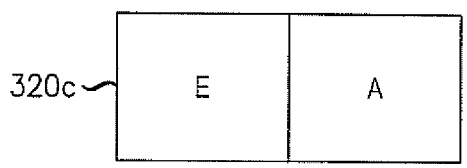
Figure 3:
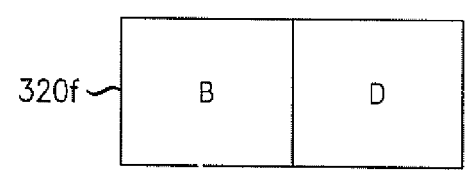

FIG. 3 illustrates an exemplary data structure 300 for storing a file block. Data structure 300 may include a file block 310 that may be stored in a cache such as file cache 260 and chunks 320a-f that may be stored in chunk storage 240 of data centers 135a-f. Data structure 300 may illustrate how an erasure code may be used to provide resilient distributed storage of a file block in a cloud environment. The exemplary data structure 300 shown may be used to store and recover a file block even if two or more of the data centers are unavailable. It should be recognized that data structure 300 may be a simplification of an erasure code. Known erasure codes may be used to provide more efficient storage, more resiliency, and/or Jess latency.

File block 310 may be divided into a plurality of segments: A, B, C, D, and E. Chunks 320a-f may each include two of the segments. For example, chunks 320a-f may include the segment combinations {A,B}, {C,D}, {E,A}, {B,C}, {D,E}, and {B,D}, respectively. Each of the chunks 320a-f may be stored at a separate data center 135a-f. File block 310 may be regenerated from any four of the chunks 320a-f. Accordingly, file block 310 may be regenerated even if two of the chunks are unavailable. In some cases, file block 310 may be regenerated from only three chunks. Chunks 320a-f may require a total of twelve segments to store. In comparison, file block 310 could be stored on three data centers 135 providing resiliency against failure at two data centers, but three copies of file block 310 would require fifteen segments to store.

Figure 4:
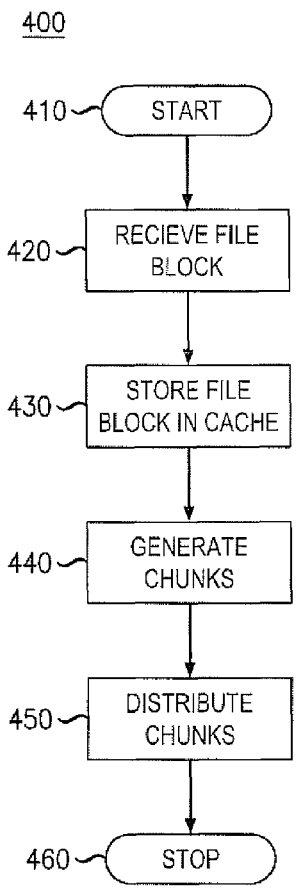
FIG. 4 illustrates a flowchart showing an exemplary method of storing a file block in a cloud service.

FIG. 4 illustrates a flowchart showing an exemplary method 400 of storing a file block. Method 400 may be performed by the various components of a data center 135, Method 400 may begin at step 410 and proceed to step 420.

In step 420, data center 135 may receive a request to store a file block from a client device 110. Data center 135 may determine whether it is the primary data center for the client device. If data center 135 is not the primary data center, data center 135 may forward the request to the primary data center. Alternatively, data center 135 may process the request as a secondary data center. Data center 135 may also process the request if the primary data center is unavailable. The method may then proceed to step 430.

In step 430, data center 135 may store the received file block in file cache 260. If the file cache 260 is full, data center 135 may replace a file block that is stored in the cache with the received file block. Step 430 may be optional. In various alternative embodiments, data center 135 may not immediately store a received file block in the file cache 260. If data center 135 is a secondary data center, data center 135 may skip step 430. The method may then proceed to step 440.

In step 440, data center 135 may generate chunks from the received file block. Data center 135 may use an erasure code to generate the chunks. In various exemplary embodiments, data center 135 may generate one chunk for each available data center including data center 135. In various alternative embodiments, any number of chunks may be generated. In step 450, data center 135 may distribute the chunks to other data centers for storage. In various exemplary embodiments, one chunk may be distributed to each data center including the primary data center 135. In various alternative embodiments, a plurality of chunks may be distributed to a data center and duplicate chunks may be distributed to multiple data centers. At least a first chunk and a second chunk of the plurality of chunks may be distributed a different one of the plurality of data centers. Once the chunks have been distributed, the file block may be resiliently stored in cloud service 130 and the method may proceed to step 460. In step 460, method 400 may end.

Figure 5:
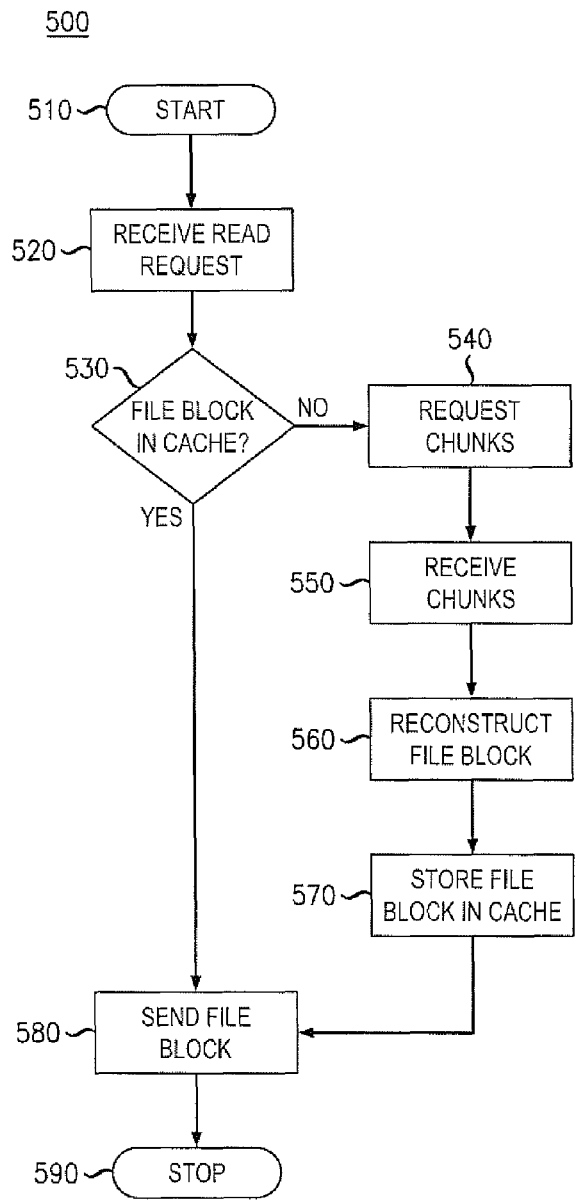
FIG. 5 illustrates a flowchart showing an exemplary method for reading a file block stored in a cloud service.

FIG. 5 illustrates a flowchart showing an exemplary method 500 for reading a file block stored in a cloud service. Method 500 may be performed by the various components of a data center 135. Method 500 may begin at step 510 and proceed to step 520.

In step 520, data center 135 may receive a request to read a file block. Data center 135 may determine whether it is the primary data center for the client device. If data center 135 is not the primary data center, data center 135 may forward the request to the primary data center. Alternatively, data center 135 may process the request as a secondary data center. Data center 135 may also process the request if the primary data center is unavailable. The method may then proceed to step 530.

In step 530, data center 135 may determine whether the requested file block is stored in the file cache 260. Data center 135 may determine whether a requested range of bytes corresponding to a file block is stored in the file cache 260. If data center 135 is not the primary data center, the requested file block may not be stored in the file cache 260. Even if data center 135 is the primary data center, the requested file block may not be stored in the file cache 260 because it has not been accessed recently and has been replaced. If the requested file block is stored in the file cache 260, the method may proceed directly to step 580. If the requested file block is not stored in the file cache 260, the method may proceed to step 540.

In step 540, data center 135 may request chunks from the other data centers. In step 550, data center 135 may receive the requested chunks from one or more of the other data centers. Data center 135 may not receive a requested chunk from one or more of the other data centers. For example, the other data center may be unavailable or may have failed to retrieve the requested chunk. In any case, method 500 may proceed to step 560 when data center 135 receives a subset of the chunks.

In step 560, data center 135 may regenerate the requested file block from the received subset of chunks. Data center 135 may regenerate the file block according to the erasure code used to generate the chunks. In various exemplary embodiments using a systematic erasure code, the file block may be regenerated from the unencoded chunks without decoding the coded chunks. Receiving chunks and regenerating the file block based on the chunks may consume processing power of data center 135. The time spent regenerating the requested file block may also add latency to fulfilling the request of client device 110. Once the complete file block has been reconstructed, the method 500 may proceed to step 570.

In step 570, data center 135 may store the complete file block in the file cache 260. If the file cache 260 is full, data center 135 may replace one or more existing file blocks in the file cache 260 with the regenerated file. Having the file block stored in file cache 260 may allow data center 135 to more quickly fulfill a subsequent request involving the file block. If data center 135 is a secondary data center for the data file, data center 135 may forward the complete file block to the primary data center for storage in the file cache at the primary data center. The method 500 may then proceed to step 580.

In step 580, data center 135 may send the file block to the requesting client device 110. The client device 110 may receive the requested file block. The file block may remain resiliently stored in cloud service 130 with a cached copy stored in the file cache at the primary data center. The method 500 may then proceed to step 590, where the method 500 ends.

Figure 6:
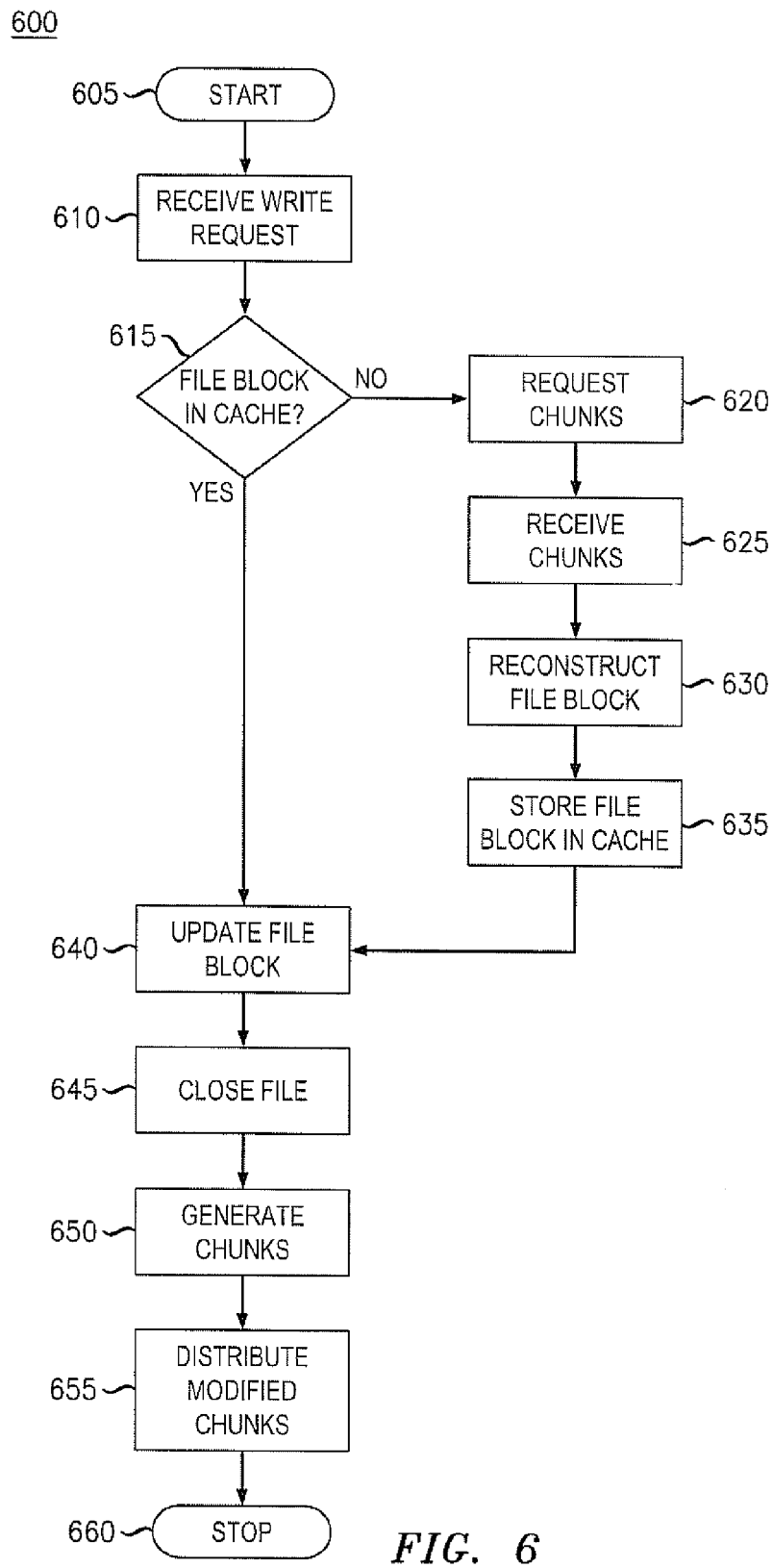
FIG. 6 illustrates a flowchart showing an exemplary method for writing to a file block stored in a cloud service.

FIG. 6 illustrates a flowchart showing an exemplary method 600 for writing to a file block stored in a cloud service 130. Method 600 may be performed by the various components of a data center 135. Method 600 may begin at step 605 and proceed to step 610.

In step 610, data center 135 may receive a request from a client device 110 to write to a file block stored in cloud service 130. The write request may include a modification of part of the file block while leaving other parts of the file unchanged. Data center 135 may determine whether it is the primary data center for the client device 110 or the file. If data center 135 is not the primary data center, data center 135 may forward the request to the primary data center. Alternatively, data center 135 may process the request as a secondary data center. Data center 135 may also process the request if the primary data center is unavailable. Data center 135 may use journaling to prevent corruption of files during writing. The write request may be journaled to recover from potential write errors. The method 600 may then proceed to step 615.

In step 615, data center 135 may determine whether the file block is stored in file cache 260. The file block may be stored in the file cache 260 if it was recently accessed to read. It may be likely that the file block for a write request will be stored in the file cache 260 because a client device 110 usually reads the file block before modifying it and then sending a write request. If, however, many files are being accessed, a file block may be removed from the file cache 260 before a write request arrives. If the file block is currently stored in file cache 260, the method 600 may proceed to step 640. If the file block is not currently stored in the file cache 260, the method 600 may proceed to step 620.

In step 620, the data center 135 may request chunks from the other data centers. If the write request only affects a subset of the chunks, data center 135 may request only the affected chunks. The method 600 may then proceed to step 625, where data center 135 may receive the requested chunks. Data center 135 may not receive a chunk from another data center if, for example, the other data center is unavailable due to a power outage. Once a subset of chunks has been received, the method 600 may proceed to step 630.

In step 630, data center 135 may regenerate the requested file from the received subset of chunks. Data center 135 may regenerate the file block according to the erasure code used to generate the chunks. Receiving chunks and regenerating the file block based on the chunks may consume processing power of data center 135. The time spent regenerating the requested file block may also add latency to fulfilling the request of client device 110. Once the complete file block has been reconstructed, the method 600 may proceed to step 635.

In step 635, data center 135 may store the complete file block in the file cache 260. If the file cache is full, data center 135 may replace one or more existing file blocks in the file cache 260 with the regenerated file block. Having the file block stored in file cache 260 may allow data center 135 to more quickly fulfill a subsequent request involving the file. If data center 135 is a secondary data center for the data file, data center 135 may forward the complete file block to the primary data center for storage in the file cache at the primary data center. The method 600 may then proceed to step 640.

In step 640, data center 135 may update the stored file block by writing to the file block as required by the write request. Data center 135 may open the file when writing to the file block. The write request may modify or replace any part of the file block or the entire file. Data center 135 may modify the copy of the file block stored in the file cache 260. Once data center 135 has processed the write request and updated the file block, the method 600 may proceed to step 645, where data center 135 may close the file. Closing the file may prevent further modification of the file. Data center 135 may also determine properties such as file size, modification date, authors, etc. when closing the file. The method 600 may then proceed to step 650.

In step 650, data center 135 may generate chunks from the updated file block according to the erasure code. In various exemplary embodiments, chunks may be generated based on only the modified portions of the file block. Some chunks may be unchanged by the modification. In various alternative embodiments, step 650 may be delayed until the file block is about to be replaced in the file cache 260. The method 600 may then proceed to step 655.

In step 655, data center 135 may distribute modified chunks to the other data centers. Data center 135 may distribute only the chunks that have been modified. Data center 135 may save time and communication costs if the chunk stored at another data center has not been modified. Once the modified chunks have been distributed, the modified file block may be resiliently stored in the cloud service 130, and the method 600 may proceed to step 660, where the method 600 ends.

Figure 7:
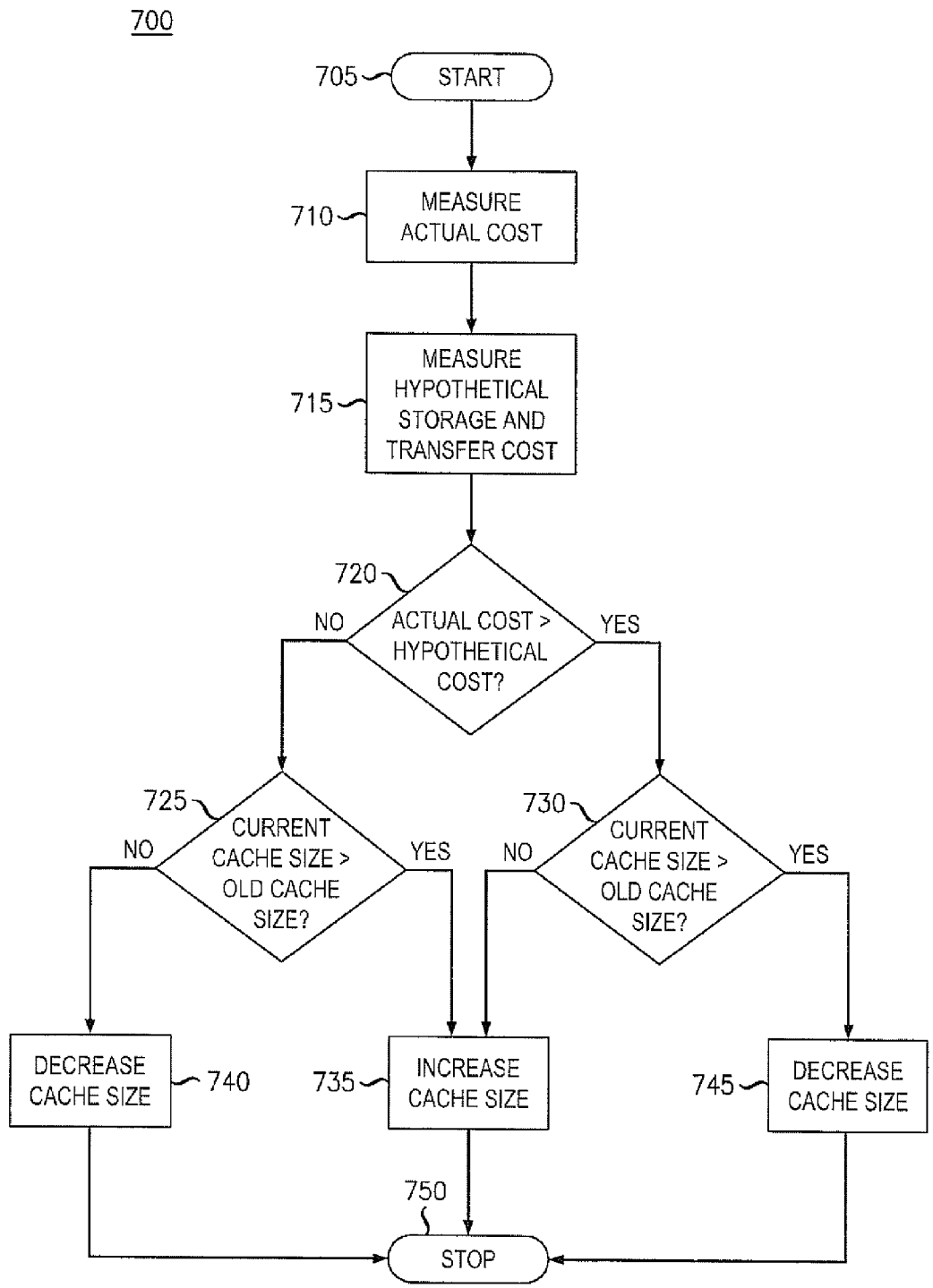
FIG. 7 illustrates a flowchart showing an exemplary method of adjusting the size of a cache.

FIG. 7 illustrates a flowchart showing an exemplary method 700 of adjusting the size of a cache. The method 700 may be used by a data center 135 or other computer such as a client device 110 to minimize the cost of storing multiple files in cloud service 130. The method 700 may attempt to minimize the cost of cloud service 130 by adjusting the cache size to efficiently store files and process requests. The method 700 may measure an actual cost and a hypothetical cost then adjust the cache size toward the less expensive direction. The method 700 may be performed repeatedly to continually adjust the cache size. The method 700 may begin at step 705 and proceed to step 710.

In step 710, the data center 135 or client device 110 may measure the actual cost of cloud service 130 during a time interval. The cost of the cloud service 130 may be measured by various functions. The cost function may depend on various parameters such as, for example, data storage amount, cache size, number of requests, inter data center transfer amount, and data center processing amount. For example, if method 700 is performed by a cloud service customer, the cost may be measured by an amount charged by the cloud service provider. As another example, if method 700 is performed by a cloud service provider, the provider may assess a value for each system resource used by cloud service 130. In various exemplary embodiments, the cache size may be weighted equally with the data storage amount. The cost may be determined on a per customer, per data center, and/or service wide basis. Any time interval may be used. A time interval equal to a measured billing period may be suitable. For example, a time interval of one day may be appropriate if a customer is charged for its daily data storage amount. The method 700 may then proceed to step 715.

In step 715, the data center 135 or client device 110 may determine a hypothetical cost of cloud service 130. The hypothetical cost may be based on a different cache size. In various exemplary embodiments, the hypothetical cost may be based on the previous cache size. The function used to measure the hypothetical cost may be identical to the function used to measure the actual cost. Accordingly, step 715 may be similar to step 710. Steps 710 and 715 may occur in any order. The method may then proceed to step 720.

In step 720, the data center 135 or client device 110 may determine whether the actual cost measured in step 710 is greater than the hypothetical cost determined in step 715. If the actual cost is greater than the hypothetical cost, the method may proceed to step 730. If the hypothetical cost is greater than the actual cost, the method may proceed to step 725.

In step 725, the data center 135 or client device 110 may determine whether the current cache size is greater than the old cache size used to determine the hypothetical cost. If the current cache size is greater, the method 700 may proceed to step 735. If the old cache size is greater, the method may proceed to step 740.

In step 730, the data center 135 or client device 110 may determine whether the current cache size is greater than the old cache size used to determine the hypothetical cost. If the current cache size is greater, the method 700 may proceed to step 745. If the old cache size is greater, the method 700 may proceed to step 735. In other words, step 730 may be similar to step 725, but with opposite results.

In step 735, data center 135 may increase the cache size. Data center 135 may increase the cache size for a particular customer or the cache size for all customers. Data center 135 may also indicate that other data centers should increase the cache size. The size of the increase may vary. In various exemplary embodiments, the cache size may increase by one gigabyte. The method 700 may then proceed to step 750, where the method 700 ends.

Steps 740 and 745 may be identical. In steps 740 and/or 745, data center 135 may decrease the cache size. Data center 135 may decrease the cache size for a particular customer or the cache size for all customers. Data center 135 may also indicate that other data centers should decrease the cache size. The size of the decrease may vary. In various exemplary embodiments, the cache size may decrease by one gigabyte. The method 700 may then proceed to step 750, where the method 700 ends.

According to the foregoing, various exemplary embodiments provide for a method and file system for cloud computing. In particular, by distributing file chunks and providing a file cache at a data center the goals of high resiliency and low latency can be met at low cost.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of storing a file block in a cloud system including a plurality of data centers, the method comprising:
   receiving, at a first data center, a file block from a client;
   generating a plurality of chunks from the file block, wherein each chunk is smaller than the file block, and the file block is capable of reconstruction from a subset of the chunks,
   wherein the plurality of chunks are generated according to a systematic erasure code wherein the file block is divided into a subset of un-encoded chunks and a subset of coded chunks;
   distributing the plurality of chunks to at least two of the plurality of data centers; wherein at least a first chunk and a second chunk of the plurality of chunks are distributed to different ones of the plurality of data centers; and initiating storage of the file block in a cache at the first data center.

2. The method of claim 1, further comprising:
receiving a request, from a client, to read the file block;
determining whether the file block is stored in the cache;
if the file block is stored in the cache, sending the file block stored in the cache to the client.

3. The method of claim 2, further comprising:
if the file block is not stored in the cache:
requesting chunks from the plurality of data centers;
receiving at least a subset of the plurality of chunks from the plurality of data centers;
reconstructing the file block from the subset of chunks;
storing the file block in a cache at the first data center; and
sending the reconstructed file block to the client.

4. The method of claim 1, wherein the step of generating a plurality of chunks from the file comprises using an erasure code to generate the plurality of chunks.

5. The method of claim 4, wherein the erasure code is at least one of Reed-Solomon codes, MDS codes, and LDPC codes.

6. The method of claim 1, further comprising:
receiving a request to write to the file block;
writing to the file block in the cache;
closing the written file block;
generating a second plurality of chunks from the written file block; and
distributing each chunk of the second plurality of chunks to a different one of the plurality of data centers.

7. The method of claim 6, wherein the second plurality of chunks includes only modified chunks.

8. A method of storing a file block in a cloud system including a plurality of data centers, the method comprising:
receiving, at a first data center, a file block from a client;
generating a plurality of chunks from the file block, wherein each chunk is smaller than the file block, and the file block is capable of reconstruction from a subset of the chunks;
distributing the plurality of chunks to at least two of the plurality of data centers; wherein at least a first chunk and a second chunk of the plurality of chunks are distributed to different ones of the plurality of data centers;
initiating storage of the file block in a cache at the first data center;
comparing an actual storage and transfer cost for a current cache size with a hypothetical storage and transfer cost for a previous cache size; and
adjusting the cache size based on the lower storage and transfer cost.

9. The method of claim 1, further comprising:
determining that the cache is full; and
removing a file block from the cache.

10. The method of claim 1, wherein the number of chunks is at least two more than the number in a subset of chunks.

11. A cloud system for storing a file block, the system comprising:
a plurality of data centers including a primary data center, the primary data center comprising:
a cache configured to store at least one complete file block;
a chunk storage configured to store a chunk for each of a plurality of file blocks;
a file encoder configured to generate a plurality of chunks from the file block, wherein each chunk is smaller than the file block and the file block is capable of reconstruction from a subset of the chunks,
wherein the plurality of chunks are generated according to a systematic erasure code wherein the file block is divided into a subset of un-encoded chunks and a subset of coded chunks; and
a file decoder configured to reconstruct a complete file block from a subset of the chunks.

12. The cloud system of claim 11, wherein the cache is a hard disk.

13. The cloud system of claim 11, wherein the primary data center further comprises a client interface configured to receive complete file blocks from a client and send complete file blocks to a client.

14. The cloud system of claim 11, wherein the primary data center further comprises a cloud interface configured to distribute a chunk of a plurality of chunks to each of the plurality of data centers and configured to receive a subset of chunks from the plurality of data centers.

15. The cloud system of claim 11, wherein the number of chunks in the subset is at least two less than the number of the plurality of chunks generated by the file encoder.

16. A tangible and non-transitory machine-readable storage medium encoded with instructions thereon for execution by a data center, the tangible and non-transitory machine-readable storage medium comprising:
instructions for receiving, at a first data center, a file block of a file from a client;
instructions for generating a plurality of chunks from the file block, wherein each chunk is smaller than the file block and the file block is capable of reconstruction from a subset of the chunks,
wherein the instructions for generating a plurality of chunks from the file block comprise instruction for using a systematic erasure code to generate the plurality of chunks wherein the file block is divided into a subset of un-encoded chunks and a subset of coded chunks;
instructions for distributing the plurality of chunks to at least two of the plurality of data centers; wherein at least a first chunk and a second chunk of the plurality of chunks are distributed to different ones of the plurality of data centers; and
instructions for initiating storage of the file block in a cache at the first data center.

17. The tangible and non-transitory machine-readable storage medium of claim 16, further comprising:
instructions for receiving a request to write to the file block;
instructions for writing to the file block in the cache;
instructions for closing the written file block;
instructions for generating a second plurality of chunks from the written file block;
instructions for distributing each chunk of the second plurality of chunks to a different one of the plurality of data centers.

18. A tangible and non-transitory machine-readable storage medium encoded with instructions thereon for execution by a data center, the tangible and non-transitory machine-readable storage medium comprising:
instructions for receiving, at a first data center, a file block of a file from a client;
instructions for generating a plurality of chunks from the file block, wherein each chunk is smaller than the file block and the file block is capable of reconstruction from a subset of the chunks;
instructions for distributing the plurality of chunks to at least two of the plurality of data centers; wherein at least a first chunk and a second chunk of the plurality of chunks are distributed to different ones of the plurality of data centers;

instructions for initiating storage of the file block in a cache at the first data center;

instructions for comparing an actual storage and transfer cost for a current cache size with a hypothetical storage and transfer cost for a previous cache size; and instructions for adjusting the cache size based on the lower storage and transfer cost.

19. The tangible and non-transitory machine-readable storage medium of claim 16, further comprising:

instructions for receiving a request to read the file block from a client;

instructions for determining whether the file block is stored in the cache;

if the file block is not stored in the cache:
  instructions for requesting chunks from the plurality of data centers;
  instructions for receiving a subset of chunks from the plurality of data centers;
  instructions for reconstructing the file block from the subset of chunks;
  instructions for storing the file block in the cache; and
  instructions for sending the file block to the client.

20. An apparatus for storing a file block, the apparatus comprising:

a cache configured to store at least one complete file block;

a chunk storage configured to store a chunk for each of a plurality of file blocks;

a file encoder configured to generate a plurality of chunks from the file block, wherein each chunk is smaller than the file block and the file block is capable of reconstruction from a subset of the chunks, wherein the file encoder is configured to use a systematic erasure coding to generate the plurality of chunks wherein the file block is divided into a subset of un-encoded chunks and a subset of coded chunks; and a file decoder configured to reconstruct a complete file block from a subset of the chunks.

21. The apparatus of claim 20, further comprising a cloud interface configured to distribute the plurality of chunks to at least two of a plurality of data centers; wherein at least a first chunk and a second chunk of the plurality of chunks are distributed to different ones of the plurality of data centers.

22. The apparatus of claim 21, further comprising a client interface configured to: receive a request, from a client, to read the file block; determine whether the file block is stored in the cache; and send the file block stored in the cache to the client, wherein if the file block is not stored in the cache, the cloud interface is further configured to: request chunks from the plurality of data centers; and receive at least a subset of the plurality of chunks from the plurality of data centers, wherein the file decoder is configured to reconstruct the file block from the subset of chunks and store the file block in the cache.

* * * * *